United States Patent [19]

Bezwada

[11] Patent Number: 4,523,003
[45] Date of Patent: Jun. 11, 1985

[54] STORAGE STABLE, ONE PACKAGE, HEAT CURABLE POLYUREA/URETHANE COATING COMPOSITIONS AND METHOD OF PREPARATION

[75] Inventor: Rao S. Bezwada, Whitehouse Station, N.J.

[73] Assignee: American Cyanamid Company, Stamford, Conn.

[21] Appl. No.: 568,160

[22] Filed: Jan. 4, 1984

[51] Int. Cl.³ .................. C08G 18/24; C08G 18/32; B05D 3/02; B05D 3/00
[52] U.S. Cl. .................... 528/58; 427/372.2; 427/388.2; 524/210; 524/726; 528/44; 528/52
[58] Field of Search .............. 528/60, 44, 52, 58; 524/726, 210

[56] References Cited

U.S. PATENT DOCUMENTS

| | | | |
|---|---|---|---|
| 2,901,467 | 8/1959 | Croco | 260/77.5 |
| 3,012,987 | 12/1961 | Ansul | 260/45.4 |
| 3,049,513 | 8/1962 | Damusis et al. | 260/77.5 |
| 3,049,515 | 8/1962 | Damusis | 260/77.5 |
| 3,436,361 | 4/1969 | Wooster | 260/18 |
| 3,549,569 | 12/1970 | Farah et al. | 260/18 |
| 3,864,313 | 2/1975 | Susman | 260/75 NC |
| 3,933,725 | 1/1976 | Dearlove et al. | 260/33.6 UB |
| 4,247,676 | 1/1981 | Kimball | 528/49 |

Primary Examiner—Herbert S. Cockeram
Attorney, Agent, or Firm—Gordon L. Hart

[57] ABSTRACT

New and improved storage stable, one package, heat-curable polyurea/urethane coating compositions are disclosed which comprise:

(a) a mixture or prepolymer of
  (i) a poly aliphatic isocyanate compound of the formula:

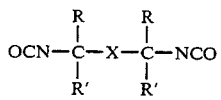

wherein R and R' are each, independently, hydrogen, alkyl or substituted alkyl and X is a bridging means selected from divalent aliphatic, cycloaliphatic, or aromatic groups, or a polymeric adduct of said aliphatic isocyanate compound possessing poly aliphatic isocyanate functionality; and
  (ii) an approximately stoichiometric amount of at least one monomeric or polymeric compound containing a plurality of isocyanate reactive hydrogens; and (b) a minor effective amount of a polymerization catalyst.

The compositions cure when heated to above about 100° C. to form coatings which exhibit good abrasion resistance, solvent resistance, weather resistance and good adhesion to a wide variety of substrates. The coating compositions are stable upon storage for several months and have useful coating lives in the presence of atmospheric moisture of up to several days.

11 Claims, No Drawings

STORAGE STABLE, ONE PACKAGE, HEAT CURABLE POLYUREA/URETHANE COATING COMPOSITIONS AND METHOD OF PREPARATION

BACKGROUND OF THE INVENTION

The present invention relates to new and improved single package, heat curable poly urea/urethane coating compositions. More particularly, it relates to aliphatic polyisocyanate-based poly urea/urethane coating compositions having improved storage stability, abrasion resistance, solvent resistance, weather resistance and good adhesion to substrates. The present invention also relates to articles coated with the new and improved coating compositions and to processes for preparing the compositions and coated substrates.

In this application, the term "aromatic isocyanate" refers to an organic isocyanate compound wherein the isocyanate group or groups is/are bonded directly to a carbon atom of an aromatic nucleus. By "aliphatic isocyanate" is meant an organic isocyanate compound wherein the isocyanate group or groups is/are bonded directly to an aliphatic carbon atom. "Polyaliphatic isocyanate" means a polyisocyanate with each isocyanate bonded directly to an aliphatic carbon atom.

Generally, polyurethane resins, upon curing, exhibit good flexibility, abrasion resistance, solvent resistance and good adhesion to a variety of substrates. Urethane resins have therefore been utilized in a variety of applications such as molding resins, potting compounds, adhesives, elastomers and coatings.

Early polyurethane coatings in the prior art are provided in the form of two component systems, wherein one component comprises an isocyanate compound and a second component comprises an hydroxyl-bearing compound. The polyurethane resins are formed by reaction of polyfunctional starting materials, the reaction between individual functional groups proceeding in accordance with the equation:

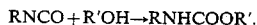

In use, the two components are mixed immediately prior to the coating application. The mixed product gels in a very short time period of, for example, from a few minutes to about 1 to 2 hours and thereafter cannot effectively be used and applied as a coating composition. The two component system coating compositions, having such a short coatability or use time before the onset of gelation, are very inconvenient because a separate mixing step is required immediately before application, and if a large area or a large number of articles need to be covered, several small batches of coating composition need to be prepared intermittently during the job to avoid wasting any unused composition which might gel before it can be applied to the substrate or substrates.

Moreover, the isocyanate groups are highly reactive with any compounds possessing reactive hydrogen which gives the coating system poor storage stability. The frequent result of high isocyanate reactivity is that the isocyanate groups pre-react with water, solvent and other materials, thereby decreasing the isocyanate functionality of the component even before it is admixed with the polyol component, which provides a less satisfactory coating. In addition, low molecular weight polyisocyanate compounds, and particularly toluene diisocyanate, are very volatile and may cause respiratory irritation at extremely low levels e.g., at concentrations on the order of 0.02 ppm in a closed environment, along with other attendant health hazards.

Early efforts at increasing the storage life of the two component compositions have included blocking the isocyanate groups by reacting them with phenols. Thereafter, when the two component system is ready for use, the polyol component is mixed with the phenol-blocked isocyanate and the mixture is coated on a substrate. The substrate and coating are then heated at elevated temperature, e.g., 350°–400° C., to dissociate the phenol from the isocyanate groups thereby liberating the isocyanate groups for reaction with the polyol to form urethanes. Phenol is evolved in the process, and this compound is extremely poisonous, so that extreme care in ventilation must be employed. Moreover, these coatings could only be used on substrates, such as metals and electrical wiring, which can withstand the high temperature treatments required to dissociate the phenols.

Early attempts were made to decrease the volatility and safety hazards of the low molecular weight isocyanate reactants. More particularly, two component compositions were improved by including the isocyanate component in the form of prepolymer adducts possessing polyisocyanate functionality. The prepolymer adducts effectively increase the molecular weight of the polyisocyanate, thereby reducing volatility and the health hazards associated therewith. Generally, the prepolymer adducts are prepared by reacting an excess of diisocyanate compound with a trihydric alcohol, e.g., trimethylolpropane, to form branched, higher molecular weight compounds possessing polyisocyanate functionality. These isocyanate prepolymer adducts may thereafter be reacted with the same or different polyols or reactive hydrogen containing compounds to form polyurethanes, polyureas, or polyesteramides via the following reactions:

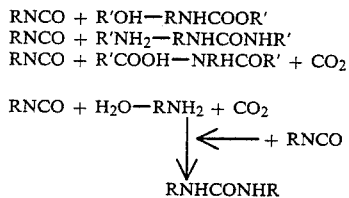

Generally, aromatic isocyanate compounds are used, such as tolylene diisocyanate, tolidine diisocyanate, and diphenylmethane diisocyanate. The isocyanate groups are still as reactive in the polymer adducts as in the monomeric precursors and therefore storage stability of these two component coating compositions is poor. After admixture with the polyol component, too rapid gelation times are still encountered. Further disadvantages of the two component polyisocyanate adduct coating compositions include the need for mixing the components prior to application and the poor weather resistance of aromatic isocyanate components e.g., they have a undesirable tendency for yellowing upon exposure to sunlight or other sources of ultraviolet light.

One component polyurethane coatings are also known. These systems are based mainly on stable isocyanate prepolymersobtained from tolylene diisocyanate and a hydroxy functional polyether. These coating compositions are moisture curable. They dry or cure by having the free isocyanate groups react with water by a reaction which proceeds through the unstable carbamic acid with carbon dioxide being eliminated to yield primary amine groups which further react with isocyanate groups to form ureas. The prepolymer for use in the one component package may be derived from other aromatic diisocyanates such as diphenylmethane diisocyanate, triphenylmethane triisocyanate and polyesters with hydroxyl terminal groups may be substituted for the polyether coreactant. These one component urethane coating compositions suffer from the same yellowing tendency upon weathering, as is common with all aromatic isocyanates.

In U.S. Pat. No. 3,296,156, one package polyurethane elastomer compositions having good storage stability and sufficiently long "pot" or use lives are described. These compositions may be cast or molded to form relatively large shaped articles. Such an elastomer composition is a mixture comprising an isocyanate terminated prepolymer adduct derived from an excess of an organic diisocyanate and a reactive hydrogen containing polymeric material having a molecular weight in excess of 500 selected from polyether glycols, polyester glycols and polyesteramides, wherein the molar ratio of diisocyanate groups to reactive hydrogen groups is from about 1.1 to 1 to about 4.0 to 1, and preferably at least about 2 to 1, and a crosslinker comprising 2-amino-2-methyl propanol.

It has now been discovered that new and improved single package heat curable polyurea/urethane coating compositions are provided in the form of a composition comprising a mixture or prepolymer of certain secondary or tertiary aliphatic isocyanates with a reactive hydrogen containing compound wherein the molar ratio of isocyanate groups to reactive hydrogens is from about 1:0.8 to about 1:1.2, respectively, and a minor effective amount of a polymerization catalyst.

SUMMARY OF THE INVENTION

In accordance with the present invention new and improved one package storage stable heat-curable polyurea/urethane coating compositions comprise:
(a) a first component comprising a mixture or a prepolymer of:
(i) an aliphatic diisocyanate compound of the formula:

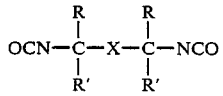

wherein R and R' are each, independently selected from hydrogen, alkyl, and substituted alkyl and X is a bridging means selected from divalent aliphatic, cycloaliphatic and aromatic groups, alone or in combination with at least one other organic compound containing polyaliphatic isocyanate functionality; and
(ii) at least one monomeric or polymeric compound containing a plurality of reactive hydrogens, wherein the molar ratio of the total isocyanate groups in (i) to the total of reactive hydrogens in (ii) is from about 1:0.8 to about 1:1.2, respectively; and (b) a minor effective amount of a polymerization catalyst.

The coating compositions of the subject invention may also additionally comprise additives such as solvents, pigments, flow promoters, pigment dispersants and the like, or curing agents containing at least three amino, imino or hydroxy groups.

In a preferred embodiment, the new and improved coating compositions of the present invention will comprise (a) a mixture or a prepolymer of α, α, α', α'-tetramethylxylylene diisocyanate and an aminoalchol or polyglycolamine, wherein the amino alcohol or polyglycol amine is added in an amount sufficient to provide about one equivalent of amino groups for each equivalent of isocyanate groups and (b) a catalyst selected from dibutyltin dilaurate, dibutyl tin diacetate, dimethyltin dilaurate, stannous octoate, and lead octoate.

In especially preferred embodiments the amino alcohol used will comprise 9-amino-10-hydroxy-stearylamine.

In accordance with the present invention, the new and improved one-package, storage stable, heat-curable poly urea/urethane coating compositions are prepared by
(a) forming a liquid mixture of a poly aliphatic isocyanate compound of the formula:

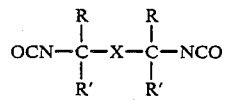

wherein R and R' are each, independently, selected from hydrogen, alkyl and substituted alkyl and X is a bridging means selected from divalent aliphatic, cycloaliphatic and aromatic groups, or a prepolymer adduct of said isocyanate possessing polyisocyanate functionality in a suitable solvent, if desired;

(b) adding to (a) a liquid mixture of at least one monomeric or polymeric compound containing a plurality of reactive hydrogens in a suitable solvent, if desired, and maintaining said reaction mixture at a temperature of from about 0° to about 25° C. for a period of time sufficient to obtain a prepolymer solution containing about 40% to about 60% by weight solids; and (c) thereafter, adding to said prepolymer solution, a minor effective amount of a polymerization catalyst to obtain a one package, storage stable, heat curable poly urea/urethane coating composition.

In still another aspect, the subject invention comprises coated articles having the new and improved poly urea/urethane coatings thereon.

In accordance with this aspect of the invention the new and improved poly urea/urethane coated articles are prepared by:
(a) providing a substrate to be coated;
(b) applying to said substrate a heat curable poly urea/urethane coating composition comprising a liquid mixture or prepolymer solution of:
(i) a secondary or tertiary poly aliphatic isocyanate compound of the formula:

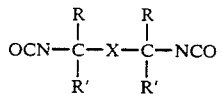

wherein R and R' are each, independently, selected from hydrogen, alkyl, and substituted alkyl and X is a bridging means selected from divalent aliphatic, cycloaliphatic and aromatic groups, or a polymeric adduct of said polyaliphatic isocyanate compound possessing polyaliphatic isocyanate functionality, with (ii) at least one monomeric or polymeric compound containing reactive hydrogens; and (iii) a minor effective amount of a polymerization catalyst; and (c) thereafter, heating said coated substrate at a temperature above about 100° C. for a time sufficient to provide a cured, strongly adhered, abrasion resistant, solvent resistant, and weather resistant coated article.

The present invention provides new and improved one-component poly urea/urethane coating compositions which are easy to handle and apply. These one component coating compositions are storage stable at ambient temperature for several days. The cured coatings made from the compositions of this invention exhibit excellent solvent resistance and high pencil hardness. The coatings do not discolor, or yellow, even upon extended exposure to ultraviolet light. The flexibility of the coatings may be varied as desired by increasing the molecular weight of the isocyanate terminated compound, i.e., the adduct component, or more preferably, by increasing the chain length of the reactive hydrogen containing component.

DETAILED DESCRIPTION OF THE INVENTION

In accordance with these and other objects, the subject invention firstly comprises as component (a) a mixture or prepolymer formed from (i) a poly aliphatic isocyanate compound; and (ii) at least one monomeric or polymeric compound containing a plurality of reactive hydrogens.

The aliphatic polyisocyanate compounds for use herein as component (a)(i) may be monomeric or polymeric compounds having a plurality of aliphatic isocyanate terminal groups. More particularly, component (a)(i) may comprise at least one poly aliphatic isocyanate compound of the formula:

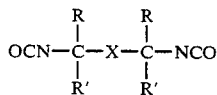

wherein R and R' are each, independently, selected from hydrogen, alkyl and substituted alkyl and X is a bridging means selected from divalent aliphatic, cycloaliphatic, and aromatic groups.

Examples of poly aliphatic isocyanate compounds for use in the coating compositions of this invention include:

α, α, α', α'-tetramethyl-1,3-xylylene diisocyanate,
α, α, α', α'-tetramethyl-1,4-xylylene diisocyanate,
methylenebis(4-cyclohexylisocyanate),
isophorone diisocyanate,
1,4-cyclohexylene diisocyanate,
and the like.

The especially preferred diisocyanate is α, α, α', α'-tetramethyl-1,3-xylylenediisocyanate, hereinafter referred to as TMXDI.

In addition to the above described monomeric aliphatic isocyanate compounds, polymeric materials derived in part from these aliphatic isocyanates and possessing terminal aliphatic isocyanate groups may also be used as component (a)(i). The polymeric materials containing aliphatic isocyanate terminal groups are polymeric adducts or urethane precursors, formed by reacting an excess of poly aliphatic diisocyanate compound, generally 1 molar equivalent, with a polyol compound, generally 0.3 to about 0.7 molar equivalents in a suitable solvent at temperatures of about 70°–80° C. for several hours, although if a catalyst is used, such as an organic tin catalyst, in an amount of from about 0.01 to 0.1 percent by weight, reaction times may be considerably reduced.

Suitable polyols which may be reacted with the polyaliphatic isocyanate compounds to form isocyanate terminated urethane precursors include: monomeric polyols such as ethylene glycol, propylene glycol, diethylene glycol, triethylene glycol, dipropylene glycol, trimethylene glycol, and 1,3- and 1,4- butanediol.

Polyether polyols, which are obtained by effecting addition of one type, or two types or more, among, for example, ethylene oxide, propylene oxide, butylene oxide, tetrahydrofuran, and styrene oxide, with for example, ethylene glycol, propylene glycol, diethylene glycol, triethylene glycol, dipropylene glycol, trimethylene glycol, 1,3- and 1,4- butanediol, 1,5-pentanediol, 1,2-hexylene glycol, 1,10-decanediol, 1,2-cyclohexanediol, 2-butene-1,4-diol, 3-cyclohexane-1,1-dimethanol, 4-methyl-3-cyclohexane-1,1-dimethanol, 3-methylene-1,5-pentanediol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-pentanediol, (4,4-pentyloxymethyl)-1,3-propanediol, 3-(o-propenylphenoxy)-1,2-propanediol, 2,2'-diisopropylidenebis (p-phenyleneoxy) diethanol, glycerin, 1,2,6-hexanetriol, 1,1,1-trimethyloethane, 1,1,1-trimethylolpropane, 3-(2-hydroxyethoxy)-1,2-propanediol, 3-(2-hydroxypropyl)-1,2-propanediol, 2,4-dimethyl-2-(2-hydroxyethoxy)-methylpentanediol-1,1,1,1-tris ((2-hydroxyethoxy)methyl)-ethane, 1,1,1-tris ((2-hydroxypropoxy) methyl) propane, pentaerythritol, sorbitol, sucrose, lactose, α-methyl glucoside, α-hydroxyalkyl glucosides, novolak resin, phosphoric acid, benzenephosphoric acid, polyphosphoric acid (such as tripolyphosphoric acid and tetrapolyphosphoric acid), and caprolactone may also be employed.

Polyester polyols foonad from one type, or two types or more, among compounds which possess at least two hydroxy groups, such as polytetramethylene ether glycol, also ethylene glycol, diethylene glycol, triethylene glycol, 1,2-propylene glycol, dipropylene glycol, trimethylene glycol, 1,3- and 1,4-butanediol, tetramethylene glycol, neopentyl glycol, hexamethylene glycol, decamethylene glycol, glycerin, trimethylolpropane, hexanetriol, pentaerythritol, and sorbitol, and one type, or two types or more, among compounds which possess at least two carboxyl groups, such as malonic acid, maleic acid, succinic acid, adipic acid, tartaric acid, pimelic acid, sebacic acid, oxalic acid, phthalic acid, terephthalic acid, hexahydrophthalic acid, aconitic acid, trimellitic acid, and hemimellitic acid can also be used.

One can further use, for example, 1,2-polybutadiene glycol, 1,4-polybutadiene glycol, polyhydroxy polyacrylate, and epoxy resins.

The polymeric isocyanate terminated urethane precursors may be used alone with a polymerization catalyst to form the coating compositions of this invention or they may be further reacted with still another monomeric or polymeric compound containing reactive hydrogens as component (a) (ii).

Component (a) (ii) may comprise any of the polyol compounds described above for forming the polymeric urethane precursors for use as component (a) (i). In addition, however, the component (a) (ii) will preferably contain reactive hydrogens contributed by both an amino group or groups as well as an hydroxyl group or groups.

Preferred compounds for use as component (a) (ii) herein are amino alcohols and polyglycolamines. The use of the amino alcohols or polyglycolamines are preferred because they provide poly urea/urethane coating compositions having extended shelf lives and extended use lives in conjunction with TMXDI.

Illustrative examples of suitable aminoalchohols and polyglycolamines which may be used as component (a) (ii) in the compositions of the present invention are the following:
2-aminoethanol,
3-amino-1-propanol,
5-amino-1-pentanol,
5-amino-2-ethyl-1-pentanol,
4-amino-1-butanol,
4-aminomethylcyclohexylmethanol,
2-amino-2-methyl-1-propanol,
5-methylamino-1-pentanol,
2-(2-aminoethoxy) ethanol,
2-(methylamino) ethanol,
9-morpholino-10-hydroxy-stearylamine,
9-amino-10-hydroxy-stearylamine,
Polyglycolamine H-221 (Union Carbide Corp.),
and the like.

The preferred aminoalcohol is 9-amino-10-hydroxystearylamine.

Generally component (a) (ii) may comprise any of the polyols and amino alcohols described above and mixtures of two or more of any of these reactive-hydrogen containing compounds can be used.

Generally component (a) (ii) will have hydroxyl values in the range of from about 30 to about 500. Component (a) (ii) is preferably added in an amount such that the molar ratio of total hydroxyl groups in (a) (ii) to the total isocyanate groups in (a) (i) is from about 1.0 to 0.8 to about 1.0 to 1.2, respectively, and molar ratios of about 1.0 to 0.95 to 1.0 to 1.1 are especially preferred.

Both component (a) (i) and (a) (ii) may be mixed or reacted in a suitable solvent.

As used herein, the term "suitable solvent" is defined as a solvent which is relatively inert to the reactants. Suitable solvents include N,N-dimethylformamide, N,N-dimethyl-acetamide, N,N-dimethylpropionamide, tetrahydrofuran, dimethyl sulfoxide, toluene, and mixtures thereof. The preferred solvent is N,N-dimethylformamide.

The coating compositions of the present invention additionally comprise a polymerization catalyst as component (b). Suitable polymerization catalysts include:

Amines such as triethylamine, tripropylamine, triisopropanolamine, tributylamine, trioctylamine, hexadecyldimethylamine, N,N-dimethylethanolamine, diethylenetriamine, N,N,N',N'-tetranethylethylenediamine, N,N,N',N'-tetramethylpropylenediamine, N,N,N',N'-tetramethylbutanediamine, N,N,N',N'-tetramethyl-1,3-butanediamine, N,N,N',N'-tetramethylhexamethylenediamine, bis(2-(N,N-dimethylamino)ethyl) ether, N,N-dimethylbenzylamine, N,N-dimethylbenzidylamine, N,N-dimethylcyclohexylamine, N,N,N',N'',N''-pentamethyldiethylenetriamine, triethylenediamine, and the formic acid salt and other salts of triethylenediamine; amino group hydroxyalkylene adducts of primary and secondary amines; aza ring compounds such as N,N-dialkylpiperazines; various types of N,N',N''-trialkylaminoalkylhexahydrotriazines; beta-aminocarbonyl catalysts of Japanese Patent, Tokyo 52 Showa 1977 - 43517; and beta-aminonitrile catalysts of Tokyo 53 Showa 1978 - 14279 and organic metal system urethane-converting catalysts such as tin acetate, tin octanoate, tin oleate, tin laurate, dibutyltin diacetate, dibutyltin dilaurate, dibutyltin dichloride, nickel naphthenate, cobalt naphthenate, mercury phenylacetate, nickel acetylacetonate, copper acetylacetonate, ferrous or ferric acetylacetonate, and molybdenum acetylacetonate oxide.

In preferred emboidments wherein component (a) (i) comprises TMXDI and component (a) (ii) comprises 9-amino-10-hydroxystearylamine, the preferred polymerization catalyst for use as component (b) comprises dibutyltin dilaurate.

Generally polymerization catalyst (b) is added in from about 0.001 to about 10.0 parts by weight, based on 100 parts by weight of component (a) (ii) or based on 100 parts by weight of the polyol used to form the urethane precursors in (a) (i).

The coating compositions of the present invention may also include other conventional additives such as solvents, pigments, flow promoters, pigment dispersants and the like, all added in their conventional amounts. Moreover, the coating compositions of this invention may also comprise other reactive components, if desired. Additional reactive components for example may include one or more curing agents in the form of compounds containing at least three amino, imino or hydroxyl groups, which may be added to the composition immediately prior to coating and curing. Examples of suitable curing agents include:
glycerol,
1,1,1-trimethylolpropane,
2,2',2''-nitrilotriethanol,
pentaerythritol,
1,2,6-hexanetriol,
1,1,1-tris (2-hydroxyethoxy)methyl)ethane,
2-ethyl-2(hydroxymethyl)-1,3-propanediol,
2-ethyl-2-(2-hydroxyethylamino)-1,3-propanediol,
3-(2-hydroxyethoxy)-1,2-propanediol,
3-(bis(2-hydroxyethyl)amino)-1-propanol,
2-amino-2-methyl-1,3-propanediol,
1,3-diamino-2-propanol,
2,2'-iminobis(ethanol),
9-amino-10-hydroxy-stearylamine,
2-amino-1,4-butanediol,
N,N-bis(2-hydroxyethyl)-1,3-propanediamine,
N-(2-hydroxyethyl)-1,3-propanediamine,
2-(2,4-diaminophenoxy)ethanol,
N,N-bis(3-aminopropyl)amine,
and the like.

The new and improved coating compositions of the present invention are prepared by mixing the TMXDI, alone or with any other aliphatic isocyanate compound, or the polymeric aliphatic isocyanate urethane precursor derived therefrom, with the polyol or amino alcohol and polymerization catalyst to obtain a one package heat curable polyurea/urethane coating composition.

More particularly, and in accordance with a preferred method, the coating compositions of the present invention are prepared by slowly adding a solution of the aminoalcohol, polyglycolamine, or other polyol selected, in a suitable solvent dropwise to a stirred solution of TMXDI or aliphaticisocyanate-terminated urethane precursor in a suitable solvent, at a temperature of from about 0° to about 25° C. and preferably from about 0° to about 10° C. The resulting solution is stirred at room temperature for about 1 to 12 hours and preferably 1 to 6 hours, to obtain a mixture or prepolymer solution containing from about 30% to about 80% by weight solids, and preferably about 40% to 60% by weight solids, and having a isocyanate content of about 2% to about 10%, and preferably about 3% to 5%. Thereafter, the polymerization catalyst is added, and the composition may be stored for up to about 6 weeks to about 6 months in a sealed container.

The resulting mixture may thereafter be used to form coatings on various articles by applying the composition to the surface of the article for example, by dipping, brushing or spraying the composition onto the substrate and thereafter heating at an elevated temperature for a time sufficient to effect curing of the composition. Preferably the surface of the substrate is heated to above 100° C., and preferably to about 150° C. for a period of about 30 minutes to cure the coating.

The resulting polyurea/urethane coatings exhibit excellent abrasion resistance, soiling resistance, solvent resistance and weather resistance. The coatings also exhibit excellent adhesion to a variety of substrates. The compositions cure by heat without the liberation of harmful toxic gases or bad odors.

In order that those skilled in the art may better understand how the present invention may be practiced, the following examples are provided by way of illustration and not by way of limitation.

DETAILED DESCRIPTION OF THE PREFERRED EMBODIMENTS

EXAMPLE 1

2-(2-Aminoethoxy)ethanol, 98% (21.46 grams; 0.2 mole) is added dropwise to a stirred mixture of α, α, α', α'-tetramethyl-1,3-xylylene diisocyanate (49.52 grams of 98.65% purity; 0.2 mole) and N,N-dimethylformamide (50 grams) over a period of 2 hours while maintaining the temperature at 0°-10° C. Upon completion of the addition, the temperature is allowed to rise to 25° C., and maintained at 25° C. for 4 hours. The solution is then allowed to stand at ambient temperature under nitrogen for 15 hours and diluted with N,N-dimethylformamide to obtain a prepolymer solution containing 58.7% by weight solids and having an isocyanate content of 3.40%.

A portion of the prepolymer solution (5.0 grams) is treated with 15 milligrams of dibutyltin dilaurate (M&T* Catalyst T-12; *trademark of M&T Chemicals, Inc.), and, within 30 minutes, the mixture is coated on an aluminum panel to provide a wet film having a thickness of 3 mils. The wet film is then cured at 150° C. for 30 minutes to obtain a smooth film having a Pencil Hardness of 2H-3H, and a solvent rub resistance to methyl ethyl ketone of over 200 double rubs using a cheesecloth wrapped around the index finger as the rubbing device, after previously immersing it in methyl ethyl ketone. [The solvent resistance test is described in detail in the National Coil Coaters Association Technical Bulletin No. 11-18 (revised)].

EXAMPLE 2

A solution of 9-amino-10-hydroxystearylamine (17.07 grams; 0.0568 mole) in a mixture of N,N-dimethylformamide (17.07 grams) and toluene (10.0 grams) is added dropwise to a stirred solution of α,α,α',α'-tetramethyl-1,3-xylylene diisocyanate (28.19 grams of 98.44% purity; 0.1136 mole) in N,N-dimethylformamide (18.19 grams) over a period of 10 minutes while maintaining the temperature at 0°-10° C. The solution is then allowed to rise to 25° C. over a period of one hour and stirred at ambient temperature for 10 hours.

Analysis of the product, after standing at ambient temperature for nine days, shows an isocyanate content of 4.55% for the solution which contains 50% solids.

A portion of the prepolymer solution (5.0 grams) is treated with 12.5 milligrams of dibutyltin dilaurate and mixture is coated on an aluminum panel to provide a wet film having a thickness of 3 mils. The wet film is then cured at 150° C. for 30 minutes to obtain a smooth film having a Pencil Hardness of 2H-3H, and a solvent resistance to methyl ethyl ketone of over 200 double rubs. The dried film is more flexible than the film of Example 1.

EXAMPLE 3

The procedure of Example 2 was followed in every detail except that 2-amino-2-methyl-1,3-propanediol (0.15 gram) was added to the mixture before curing. The resulting film had a Pencil Hardness of 3H and a solvent resistance to methyl ethyl ketone of over 200 double rubs.

EXAMPLE 4

The procedure of Example 2 was followed in every detail except that glycerol (0.10 gram) was added to the mixture before curing. The resulting film had a Pencil Hardness of 3H and a solvent resistance to methyl ethyl ketone of over 200 double rubs.

EXAMPLE 5

A solution was prepared by mixing 100 parts of a polyester polyol of hydroxyl value 250, which was obtained by condensing adipic acid, phthalic acid, and trimethylolpropane, also TMXDI 60 parts, and xylene 100 parts.

The viscosity of this solution was 50 cps/25° C., and rise in viscosity did not occur even when left standing at room temperature for 5 hours.

This solution was coated onto a tin sheet to 30H thickness and this was left standing in a heated oven at 145° C. for 30 minutes. Although the formed coating film was irradiated with ultraviolet rays in a Fade-Ometer for 300 hours, discoloration was not seen.

EXAMPLE 6

A solution was obtained by mixing 100 parts of a polyester polyol of hydroxyl value 290, which was obtained by condensing adipic acid, terephthalic acid, and 1,3,6-hexanetriol, also TMXDI 61 parts, cyclohexanone 80 parts, xylene 80 parts, and triethylenediamine 0.1 part. The viscosity of this solution was 40 cps/25° C., and viscosity change was not seen even after it was left standing at room temperature for 5 hours.

This solution was coated onto a steel sheet and after heating it in a heated oven at 280° C. for 10 minutes, it was left to cool.

This coating film had a Pencil Hardness of 2H and as a result of irradiation with ultraviolet rays for 300 hours in a Fade-Ometer, discoloration was not seen.

EXAMPLE 7

TMXDI 39.3 parts and 1,4-butanediol 10 parts were mixed and a prepolymer was produced by heating at 80° C. for 3 hours.

Mixed were 100 parts of a polyether polyol of hydroxyl value 56, which was obtained by performing addition polymerization of polypropylene oxide toward glycerin, prepolymer 49.3 parts, and copper acetylacetonate 0.1 part.

The viscosity of this mixture was 500 cps/25° C., and it did not develop viscosity change even when left standing at room temperature for 5 hours.

An aluminum block was immersed in this mixture and after pulling it out, it was heated while rotating in a heated oven at 200° C. for 15 minutes. When cooled to room temperature, an elastic coating film formed at the surface of the block. This coating film did not develop discoloration even when irradiated with ultraviolet rays in a Fade-Ometer for 300 hours.

EXAMPLE 8

TMXDI 20 parts was added to a solution which consisted of 100 partsofa polyhydroxy polyacrylate of hydroxyl value 90, which was obtained by copolymerizing ethyl acrylate and hydroxyethyl methacrylate; ethyl acetate, 30 parts, and toluene 30 parts, and thorough mixing was performed. This mixed product did not undergo viscosity rise after 5 hours at room temperature.

This solution was coated onto a copper sheet and after heating it at 180° C. for 15 minutes, it was cooled. The film which was obtained did not develop discoloration even after irradiation with ultraviolet rays in a Fade-Ometer for 300 hours.

Although the present invention has been described with reference to certain preferred embodiments, modifications or changes may be made therein by those skilled in the art without departing from the scope and spirit of the present invention as defined by the appended claims.

What is claimed is:

1. A one package, storage stable heat-curable poly urea/urethane coating composition, said composition comprising:
    (a) a mixture or a prepolymer of
        (i) a poly aliphatic isocyanate compound of the formula:

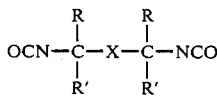

wherein R and R' are each, independently, selected from hydrogen, alkyl or substituted alkyl and X is a bridging means selected from divalent aliphatic, cycloaliphatic or aromatic groups, or a polymeric adduct of said aliphatic isocyanate said polymeric adduct possessing polyaliphatic isocyanate functionality; and
        (ii) at least one monomeric or polymeric compound containing a plurality of isocyanate-reactive hydrogens, wherein the molar ratio of the total isocyanate groups in (i) to the total reactive hydrogens in (ii) is from about 1:0.8 to about 1:1.2, respectively; and
    (b) a minor effective amount of a polymerization catalyst.

2. A poly urea/urethane coating composition as defined in claim 1, wherein component (a) (i) comprises α,α,α',α'-tetramethylxylylene diisocyanate.

3. A poly urea/urethane coating composition as defined in claim 1, wherein component (a) (i) comprises a polymeric adduct of a poly aliphatic isocyanate compound and a hydroxyl terminated polyether, said adduct having aliphatic isocyanate terminal groups.

4. A poly urea/urethane coating composition as defined in claim 1 wherein component (a) (i) comprises a polymeric adduct of a poly aliphatic isocyanate compound and a hydroxyl-terminated polyester, said adduct having aliphatic isocyanate terminal groups.

5. A poly urea/urethane coating composition as defined in claim 1, wherein component (a) (ii) comprises a polyol compound.

6. A poly urea/urethane coating composition as defined in claim 1, wherein component (a) (ii) comprises an aminoalcohol or a polyglycolamine.

7. A poly urea/urethane coating composition as defined in claim 6, wherein the aminoalcohol or polyglycolamine is added in an amount sufficient to provide about one equivalent of amino groups for each equivalent of isocyanate groups.

8. A poly urea/urethane coating composition as defined in claim 1, wherein component (a) (ii) comprises 9-amino-10-hydroxystearylamine.

9. A poly urea/urethane coating composition as recited in claim 1, wherein polymerization catalyst component (b) comprises dibutyltin dilaurate.

10. A one package, storage stable heat-curable poly urea/urethane coating composition, said composition comprising:
    (a) a solution of a prepolymer of α,α,α',α'-tetramethylxylylene diisocyanate and 9-amino-10-hydroxystearylamine in N,N-dimethylformamide, said solution containing from about 30% to about 80% by weight solids content and having an isocyanate content of from about 2% to about 10% by weight, based upon the total weight of the solution wherein the molar ratio of the total isocyanate groups in (a) (i) as recited in claim 1 to the total reactive hydrogens in (a) (ii) as recited in claim 1 is from about 1:0.8 to about 1:1.2, respectively; and
    (b) from about 0.001 to about 10.0 parts by weight of dibutyltin dilaurate, per 100 parts by weight of (a).

11. A method for preparing a one package, storage stable, heat-curable poly urea/urethane coating composition, said method comprising:
    (a) forming a liquid mixture of a poly aliphatic isocyanate compound of the formula:

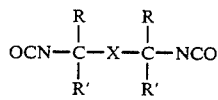

wherein R and R' are each, independently, selected from hydrogen, alkyl and substituted alkyl and X is a bridging means selected from divalent aliphatic, cyclo-aliphatic or aromatic groups, or a polymeric adduct of said aliphatic isocyanate compound possessing poly aliphatic isocyanate functionality in a suitable solvent;

(b) cooling liquid mixture (a) to a temperature of from about 0° C. to about 10° C.;

(c) forming a liquid mixture of at least one monomeric or polymeric compound containing a plurality of isocyanate-reactive hydrogens in a suitable solvent;

(d) adding the mixture of step (c) to the cooled mixture of step (b) to form a reaction mixture;

(e) permitting the reaction mixture of step (d) to come to room temperature and allowing the reaction to continue at room temperature for a time sufficient to provide a prepolymer solution containing about 30% to about 80% by weight solids; and (f) thereafter, adding to said prepolymer solution formed in step (e), a minor effective amount of a polymerization catalyst to provide a storage stable, one package, heat-curable poly urea/urethane coating composition.

* * * * *